US008343897B2

(12) United States Patent
Montgomerie et al.

(10) Patent No.: US 8,343,897 B2
(45) Date of Patent: Jan. 1, 2013

(54) SCALE INHIBITING WELL TREATMENT

(75) Inventors: Harry Montgomerie, Aberdeen (GB); Ping Chen, Aberdeen (GB); Thomas Hagen, Stavanger (NO); Liehua Zheng, Chengdu (CN)

(73) Assignees: Sichuan Sanyuan Chem Limited, Corporation, Chengdu (CN); Champion Technologies Limited, Aberdeen (GB)

( * ) Notice: Subject to any disclaimer, the term of this patent is extended or adjusted under 35 U.S.C. 154(b) by 49 days.

(21) Appl. No.: 12/160,104

(22) PCT Filed: Jan. 15, 2007

(86) PCT No.: PCT/GB2007/000099
§ 371 (c)(1),
(2), (4) Date: Dec. 15, 2008

(87) PCT Pub. No.: WO2007/080417
PCT Pub. Date: Jul. 19, 2007

(65) Prior Publication Data
US 2009/0170732 A1    Jul. 2, 2009

(30) Foreign Application Priority Data

Jan. 13, 2006 (GB) .................................. 0600692.8

(51) Int. Cl.
*C09K 8/60* (2006.01)
*C09K 8/52* (2006.01)
*E21B 37/06* (2006.01)
*E21B 43/26* (2006.01)

(52) U.S. Cl. ........ 507/222; 507/90; 166/304; 166/305.1

(58) Field of Classification Search .................... 507/90, 507/222; 166/304, 305.1
See application file for complete search history.

(56) References Cited

U.S. PATENT DOCUMENTS

| 3,912,693 | A | * | 10/1975 | Shimizu et al. | ................... 522/4 |
| 4,455,240 | A | | 6/1984 | Costello | ........................ 507/119 |
| 4,460,477 | A | | 7/1984 | Costello et al. | ............... 210/701 |
| 4,484,631 | A | | 11/1984 | Sherwood et al. | ............ 166/400 |
| 4,510,059 | A | | 4/1985 | Amjad et al. | ................. 210/701 |
| 4,801,388 | A | | 1/1989 | Fong et al. | ..................... 210/701 |

(Continued)

FOREIGN PATENT DOCUMENTS

CA        02059182        7/1992

(Continued)

OTHER PUBLICATIONS

Hall, et al., "The photoinitiated cyclopolymerization of dienes in the creation of novel polymeric systems and three-dimensional networks," 14 J. Mater. Chem. 2593-2602 (2004).

(Continued)

*Primary Examiner* — Ling Choi
*Assistant Examiner* — Aiqun Li
(74) *Attorney, Agent, or Firm* — Ballard Spahr LLP

(57) ABSTRACT

Provided is a method for inhibiting scale formation within a hydrocarbon producing system, said method comprising contacting said system with a polymer formed from a diallyl ammonium salt, a monomer comprising one carboxylate group and a monomer comprising at least two carboxylate groups or an anhydride group. Also provided are hydrocarbon well treatment compositions and polymers for use in connection with the provided methods. This abstract is intended as a scanning tool for purposes of searching in the particular art and is not intended to be limiting of the present invention.

12 Claims, 3 Drawing Sheets

U.S. PATENT DOCUMENTS

| | | | | |
|---|---|---|---|---|
| 5,015,390 | A | * | 5/1991 | Chen et al. .................. 210/698 |
| 5,038,861 | A | | 8/1991 | Shuler ........................ 166/279 |
| 5,092,404 | A | | 3/1992 | Falk et al. .................... 166/279 |
| 5,181,567 | A | | 1/1993 | Shuler ........................ 166/279 |
| 5,213,691 | A | * | 5/1993 | Emmons et al. ............. 210/700 |
| 5,604,185 | A | | 2/1997 | Hen ............................. 507/119 |
| 5,609,862 | A | | 3/1997 | Chen et al. ................ 424/70.11 |
| 5,939,362 | A | | 8/1999 | Johnson et al. .............. 507/118 |
| 6,225,430 | B1 | | 5/2001 | Fong et al. ................... 526/271 |
| 6,436,878 | B1 | | 8/2002 | Wang et al. .................. 507/119 |
| 2005/0067164 | A1 | * | 3/2005 | Ke et al. ...................... 166/304 |
| 2008/0248974 | A1 | | 10/2008 | Chen et al. .................... 507/90 |

FOREIGN PATENT DOCUMENTS

| | | | |
|---|---|---|---|
| CA | 02059182 A1 | * | 7/1992 |
| CN | 1118532 | | 8/2003 |
| EP | 0 082 567 | | 6/1983 |
| EP | 0 082 657 | | 6/1983 |
| EP | A-0082657 | | 6/1983 |
| EP | A-0161763 | | 11/1985 |
| EP | A-0521666 | | 1/1993 |
| EP | A-0643081 | | 3/1995 |
| GB | A-1447911 | | 9/1974 |
| WO | WO 2004/011772 | | 2/2004 |
| WO | WO 2007/015090 | | 2/2007 |
| WO | WO 2007/080417 | | 7/2007 |

OTHER PUBLICATIONS

Hammerschmidt, et al., "The Phosphonate-Phosphate and Phosphate-Phosphonate Rearrangement and Their Applications V[1]. On the Reaction of *s*-butyllithium/*TMEDA* with Symmetrical Trialkyl Phosphates," 128 Monatshefte Für Chemie 1173-1180 (1997).

U.S. Appl. No. 11/997,879, filed Jun. 11, 2008, Office Action Jan. 14, 2010.

U.S. Appl. No. 11/997,879, filed Feb. 4, 2008 Preliminary Amendment.

U.S. Appl. No. 11/997,879, filed Jun. 14, 2010, Response to Non-Final Office Action.

U.S. Appl. No. 11/997,879, filed Jul. 20, 2010, Non-Final Office Action.

U.S. Appl. No. 11/997,879, filed Oct. 20, 2010, Response to Non-Final Office Action.

Office Action issued Mar. 17, 2011, issued in Chinese Application No. CN200780003107.X.

* cited by examiner

SCALE INHIBITING WELL TREATMENT

CROSS-REFERENCE TO RELATED APPLICATIONS

The present application is a National Phase Application of International Application No. PCT/GB2007/000099, filed Jan. 15, 2007, which claims priority to Great Britain Patent Application No. 0600692.8, filed Jan. 13, 2006, which applications are incorporated herein fully by this reference.

This invention relates to a method of reducing scale formation in a hydrocarbon well, and to novel scale inhibitors for use in this method.

During the operation of a hydrocarbon well (i.e. a gas or oil well) various down-hole problems can arise including the deposition of scale which inhibits the hydrocarbon flow. Scale is a water-related problem which arises as a result of the commingling of incompatible aqueous fluids in the formation (i.e. the rock). For example, where sea water is injected into a subterranean formation to drive oil through the formation into a producer well hole, differences in the nature of the ions present in the injection water and that already present in the formation may cause the precipitation of metal salts. In the North Sea, typical scale problems are related to the formation of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole. Commingling of incompatible aqueous fluids usually occurs within the near well bore area of a subterranean formation. The severity of the problem is highly dependent on the field operating conditions, which can vary from mild scaling tendencies to the extreme.

Typically, to prevent scale from forming in the system, a chemical inhibitor is injected continuously and/or by periodic "squeeze" treatments. The scale inhibitor prevents the formation of scale thereby increasing oil or gas flow. Chemical scale inhibitors are thought to act either through nucleation inhibition or crystal retardation. In crystal retardation, a scale inhibitor is believed to adsorb onto the active sites of scale crystals thereby preventing further scale crystal growth. In nucleation inhibition, the mechanism of scale inhibition involves endothermic adsorption of inhibitor species which causes dissolution of the scale (e.g. barium sulphate) embryos.

In the case of reservoir treatments intended to protect the critical near well bore area, "squeeze" treatments are normally the best option. In a "squeeze" treatment, a scale inhibitor at concentrations between 5-20% by weight is normally injected into the formation through a producer well hole after a pre-flush. After over-flush and shut-in, well production is then resumed. Ideally the scale inhibitor is leached or washed back to the surface of the formation by the production water at a required minimum concentration to prevent scale formation both in the well and in the near well bore area. More specifically the leaching process should place a low but still effective, concentration (e.g. around 1-50 ppm) of the scale inhibitor in the produced water to prevent scale deposition. Depending on the inhibitor retention and release properties in the formation, however, the effect of this treatment may last from one month to about 24 months. For economic reasons, a prolonged period of protection from scale formation is clearly desirable.

An ideal scale inhibitor return curve for scale inhibitor concentration is one where, after the overflush is complete, the inhibitor desorbs into the produced water at a rate that provides a constant concentration that is the minimum required to prevent scale formation. Even more ideally, this process continues until all of the scale inhibitor squeezed into the formation is released in this way.

Sometimes, however, squeeze treatments do not provide ideal scale inhibitor return curves. Usually the concentration of scale inhibitor in the produced water is initially high, and much greater than that required to prevent scale formation, as a result of inhibitor failing to adsorb to the formation. Thereafter the concentration of scale inhibitor tends to decrease until it eventually falls below the minimum required to prevent scale deposition. The process is therefore inefficient as a large proportion of the inhibitor introduced in the squeeze treatment is returned almost immediately and does not serve to prevent scale formation. Moreover regular repetition of scale inhibitor treatment is highly undesirable as oil production invariably needs to be stopped to allow the treatment to be carried out.

For use as "squeeze" chemicals, the three main properties required for scale inhibitors are as follows:
(i) Compatibility; the chemical should be compatible with the field brines and relatively stable to thermal degradation at reservoir conditions.
(ii) Threshold inhibition: the chemical should be capable of inhibiting scale formation at very low concentrations, typically of the order of 1-50 ppm.
(iii) Long "squeeze" lifetime: the chemical should show a long return profile from the reservoir (typically 3-12 months) at levels above the required threshold level or minimum inhibition concentration (MIC).

Thus, an effective "squeeze" treatment scale inhibitor should not only be capable of inhibiting scale, but also have the desired interaction with the formation to provide sufficiently extended return curves. The requirement for a long squeeze lifetime (e.g. 3 to 12 months) precludes the use of many conventional scale inhibitors which are used in other aqueous systems, e.g. boiler systems.

Indeed a wide range of scale inhibitors is commercially available, but the vast majority are designed for treatment of simple aqueous systems, e.g. boiler water, cooling and heating systems. Treatment of such systems is, however, much more straightforward than inhibiting scale in a hydrocarbon system as, once added to the system, the scale inhibitor simply circulates therethrough (i.e. the system is closed). As a result, there is no requirement that the inhibitor have a specific interaction within the system in order for it to be retained for a period of time. Hence scale inhibitors that are useful in simple aqueous systems are often not suitable for treatment of a hydrocarbon well.

Scale inhibitors commonly used in the oil industry include phosphonates, phosphonate esters, sulphonates and polymers such as homo- and copolymers comprising phosphonate, sulphonate and/or carboxylate groups. However, in some circumstances, these chemicals are unable to prevent scale precipitation, e.g. where the scaling potential is extremely high.

Thus, there is still a need for alternative methods of well treatment which inhibit (e.g. prevent) scale formation, and in particular, for methods which improve scale inhibition efficiency and/or extend the effects of a "squeeze" treatment. In addition, due to increased environmental concerns, the scale inhibitors for use in such methods should preferably exhibit good biodegradation properties with low toxicity and low bioaccumulation.

We have now found that certain polymeric agents are especially suitable for use as scale inhibitors, particularly when applied as a "squeeze" treatment.

Thus viewed from one aspect the invention provides a method for inhibiting (e.g. preventing) scale formation within a hydrocarbon producing system (e.g. a subterranean formation), said method comprising contacting said system with a polymer formed from a diallyl ammonium salt, a monomer comprising one carboxylate group and a monomer comprising at least two carboxylate groups or an anhydride group.

In a preferred embodiment of the method of the present invention, said method comprises squeeze treating said system with a polymer as hereinbefore defined.

Viewed from another aspect the invention provides the use of a polymer formed from a diallyl ammonium salt, a monomer comprising one carboxylate group and a monomer comprising at least two carboxylate groups or an anhydride group as a scale inhibitor in a hydrocarbon producing system.

Viewed from a still further aspect the invention provides the use of a polymer formed from a diallyl ammonium salt, a monomer comprising one carboxylate group and a monomer comprising at least two carboxylate groups or an anhydride group for the manufacture of a treatment composition for the inhibition (e.g. prevention) of scale formation in a hydrocarbon producing system.

Viewed from yet another aspect the invention provides a hydrocarbon well treatment composition comprising a carrier liquid and a polymer formed from a diallyl ammonium salt, a monomer comprising one carboxylate group and a monomer comprising at least two carboxylate groups or an anhydride group.

As used herein the term "scale" is intended to encompass any precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$. The scale inhibitors of the present invention are particularly effective in inhibiting and/or preventing formation of scale comprising $BaSO_4$.

The term "hydrocarbon producing system" is used herein to encompass the subterranean formation (e.g. rock) from which hydrocarbon is extracted as well as the equipment used in the extraction process. This equipment includes both subsurface and surface equipment (e.g. tubes, pipes, pumps, valves, nozzles, storage containers, screens, etc). In a preferred aspect of the present invention the scaling of hydrocarbon extraction equipment is inhibited or prevented.

The term "squeeze treating" is used herein to refer to a method wherein a scale inhibitor is introduced into a hydrocarbon producing system and after well production is resumed, the scale inhibitor is returned in the production waters at a concentration effective to inhibit scale formation for a period of at least 6 months, more preferably at least 9 months, e.g. at least 12 months. Squeeze treatment may optionally include a preflush and/or an overflush.

Polymers for use in the invention are made from at least three different monomers as hereinbefore defined. Preferred polymers are made from 3-8 different monomers, more preferably 3-6 different monomers, e.g. 3, 4 or 5 different monomers. Preferably the polymers for use in the invention do not contain any non-ionic monomers.

Preferred polymers for use in the invention are formed from a diallyl ammonium salt, one or two different monomers each comprising one carboxylate group and one or two different monomers each comprising at least two carboxylate groups or an anhydride group. Particularly preferred polymers are formed from two different monomers each comprising at least two carboxylate groups or an anhydride group.

Particularly preferred polymers for use in the invention are terpolymers. As used herein the term "terpolymer" is used to denote a polymer made from three different monomers. Typical terpolymers for use in the invention will comprise at least 2 wt %, preferably at least 5 wt. %, more preferably at least 10 wt. %, e.g. at least 20 wt. % of each monomer relative to the total weight of monomers. Preferred terpolymers for use in the invention do not contain any non-ionic monomers.

Diallyl ammonium salts suitable for use in the present invention include compounds of formula (I):

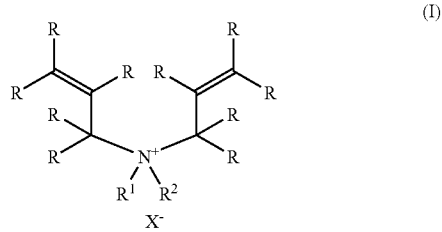

(I)

(wherein
$R^1$ and $R^2$ are each independently hydrogen or optionally substituted organic radicals having from 1 to 20 carbon atoms, preferably 1 to 12 carbon atoms, e.g. 1 to 6 carbon atoms;
each R is independently selected from hydrogen and organic radicals having from 1 to 20 carbon atoms, e.g. 1 to 6 carbon atoms; and
X is a counterion which may optionally be covalently bonded to either $R^1$ or $R^2$).

Preferred monomers of formula (I) are those wherein each R is a hydrogen atom or a substituted or unsubstituted, preferably unsubstituted, alkyl, alkenyl or aryl group. Particularly preferably, each R is a hydrogen atom or an alkyl group (e.g. methyl or ethyl). Although each R may be different, in preferred monomers of formula (I) each R is the same. Still more preferably, each R is a hydrogen atom.

In formula (I), X is preferably sulfate, phosphate or a halide, especially chloride.

In particularly preferred monomers of formula (I), X is not covalently bonded to either $R^1$ or $R^2$ (i.e. it stands as a separate or free counterion). In these monomers, $R^1$ and $R^2$ are each independently a substituted or unsubstituted, preferably unsubstituted, alkyl, alkenyl or aryl group. Particularly preferably, $R^1$ and $R^2$ are each independently an alkyl group, especially an unsubstituted alkyl group. Preferred alkyl groups have from 1 to 8 carbon atoms, e.g. $C_{1-6}$. Representative examples of preferred alkyl groups include methyl, ethyl, propyl, butyl and pentyl. Methyl is particularly preferred. Although $R^1$ and $R^2$ may be different, in preferred monomers of formula (I), $R^1$ and $R^2$ are the same (e.g. $R^1$ and $R^2$ are both methyl).

In formula (I), X may be covalently linked either to $R^1$ or $R^2$. The structure of a monomer of this type in which X is linked to $R^2$ is shown below in formula (Ia):

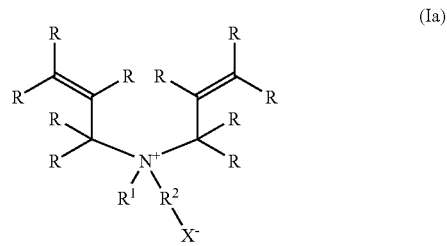

(Ia)

(wherein
R, $R^1$, $R^2$ and X are as hereinbefore defined).

In those monomers where X is covalently bonded to $R^1$ or $R^2$ (e.g. in monomers of formula (Ia)), the $R^1/R^2$ group to which it is bound is preferably an unsubstituted, alkyl, alkenyl or aryl group. Particularly preferably, the $R^1/R^2$ group to which X is bound is an alkyl group (e.g. a $C_{1-8}$ alkyl group, more preferably a $C_{1-4}$ alkyl group). Ethyl (—$CH_2CH_2$—) is particularly preferred. The remaining $R^1/R^2$ group (i.e. $R^2$ when X is bound to $R^1$ and vice versa) is preferably as defined above for $R^1$ and $R^2$ when X is not covalently bound to the monomer structure.

Polymers for use in the invention may comprise one or more (e.g. 2 or 3, preferably 2) different monomers of formula (I). Preferably, however, the polymers comprise one type of monomer of formula (I).

A particularly preferred polymer (e.g. terpolymer) for use in the invention is that formed from diallyldimethyl ammonium chloride (DADMAC). DADMAC is commercially available from Chengdu Cation Chemistry Company, China.

Polymers (e.g. terpolymers) for use in the invention are additionally formed from a monomer comprising one carboxylate group. By a carboxylate group is meant a group —$COO^-Z^+$ wherein Z is a counterion, preferably hydrogen or a metal atom (e.g. a group I or II metal atom). By the phrase "one carboxylate group" it is meant that only a single —COOZ group is present.

Monomers suitable for use in the present invention therefore include those compounds of formula (II):

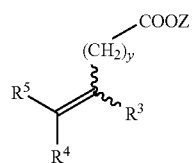

(II)

(wherein
Z is a counterion, preferably a hydrogen atom or a univalent metal atom (e.g. a hydrogen atom);
y is 0 or an integer from 1 to 3 (e.g. 1); and
$R^3$, $R^4$ and $R^5$ are each independently hydrogen, an optionally substituted alkyl or aryl group having from 1 to 6 carbon atoms, —$SO_3Z$ or —$PO_3Z_2$.

Preferred monomers of formula (II) are those wherein y is 0.

Preferred monomers of formula (II) are also those wherein $R^3$ is hydrogen or an optionally substituted alkyl or aryl group having from 1 to 6 carbon atoms. More preferably $R^3$ is a hydrogen atom or a substituted or unsubstituted, preferably unsubstituted, alkyl group. Particularly preferably $R^3$ is hydrogen or a $C_{1-3}$ alkyl group (e.g. methyl). Still more preferably $R^3$ is hydrogen.

In further preferred monomers of formula (II), $R^4$ and $R^5$ are independently hydrogen, —$SO_3Z$, —$PO_3Z_2$ or an alkyl or aryl group (e.g. an aryl group) substituted with a —$SO_3Z$ or —$PO_3Z_2$ group wherein Z is as hereinbefore defined. Although $R^5$ and $R^6$ may be different, in preferred monomers of formula (II), $R^4$ and $R^5$ will be the same. Still more preferably $R^4$ and $R^5$ are both hydrogen atoms.

Preferred monomers of formula (II) may have a cis or trans configuration. Formula (II) is therefore not intended to represent any particular geometric arrangement.

Particularly preferred polymers (e.g. terpolymers) for use in the present invention comprise a monomer selected from acrylic acid, methacrylic acid, crotonic acid and vinyl acetic acid. Acrylic acid is an especially preferred monomer. Such monomers are commercially available, e.g. from Aldrich Chemical Company Inc.

Polymers for use in the invention may comprise one or more (e.g. 2 or 3, preferably 2) different monomers of formula (II). Preferred polymers comprise one type of monomer of formula (II).

Polymers (e.g. terpolymers) for use in the invention are additionally formed from a monomer comprising at least two carboxylate groups or an anhydride group as hereinbefore defined. Monomers comprising at least two carboxylate groups or an anhydride group that are suitable for use in the present invention include those compounds of formula (III):

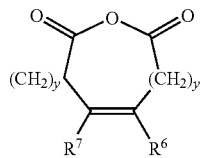

(IIIa)

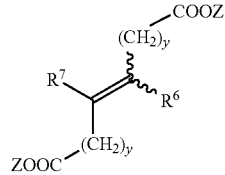

(IIIb)

(wherein
Z is a counterion preferably a hydrogen atom or a univalent metal atom (preferably a hydrogen atom);
each y is independently 0 or an integer from 1 to 3 (e.g. 1); and
$R^6$ and $R^7$ are each independently hydrogen, an optionally substituted alkyl or aryl group having from 1 to 6 carbon atoms, —$CO_2Z$, —$SO_3Z$ or —$PO_3Z_2$.

Preferred monomers of formula (III) are those wherein at least one y is 0. In still further preferred monomers, both y are 0.

Preferred monomers of formula (III) are also those wherein $R^6$ is hydrogen, an optionally substituted alkyl or aryl group having from 1 to 6 carbon atoms. More preferably $R^6$ is a hydrogen atom or a substituted or unsubstituted, preferably unsubstituted, alkyl group. Particularly preferably $R^6$ is hydrogen or a $C_{1-3}$ alkyl group (e.g. methyl). Still more preferably $R^6$ is hydrogen.

In further preferred monomers of formula (III), $R^7$ is hydrogen, —$CO_2Z$, —$SO_3Z$, —$PO_3Z_2$ or an alkyl or aryl group (e.g. an aryl group) substituted with a —$CO_2Z$, —$SO_3Z$ or —$PO_3Z_2$ group wherein Z is as hereinbefore defined. Still more preferably $R^7$ is hydrogen.

Preferred monomers of formula (III) are those of formula (IIIb). Preferred monomers of formula (IIIb) may have a cis or trans configuration. Formula (IIb) is therefore not intended to represent any particular geometric arrangement.

Particularly preferred polymers (e.g. terpolymers) for use in the present invention comprise a monomer selected from fumaric acid, maleic acid, itaconic acid and maleic anhydride. Fumaric acid and maleic acid are especially preferred monomers. Such monomers are commercially available, e.g. from Aldrich Chemical Company Inc.

Polymers for use in the invention may comprise one or more (e.g. 2 or 3, preferably 2) different monomers of formula (III). Preferred polymers comprise one type of monomer of formula (III).

Further preferred polymers for use in the invention do not comprise non-ionic monomers. Thus preferred polymers do not comprise acrylamide, methyacrylamide, N,N-dimethyl acrylamide, acrylonitrile, vinyl acetate, vinyl pyridine, hydroxyalkyl acrylates, methacrylate, butadiene, styrene, esters of olefinic carboxylic acids, alkylene oxides, divinyl ketones, vinyl ketones, divinyl ethers and alkyl vinyl ether monomers. Particularly preferably the copolymers for use in the invention do not comprise acrylamide monomers.

The polymers (e.g. terpolymers) for use in the invention may be prepared by any conventional polymerisation procedure known in the art (e.g. bulk polymerisation, solution polymerisation or suspension polymerisation). Solution polymerisation is preferred. Those skilled in the art will be aware of suitable reaction conditions as well as appropriate catalysts, polymerisation initiators and chain transfer agents. Preferred polymers for use in the invention include those obtainable by polymerisation (e.g. by solution polymerisation) of at least one monomer of formula (I), at least one monomer comprising one carboxylate group (e.g. a monomer of formula (II)) and at least one monomer comprising at least two carboxylate groups or an anhyride group (e.g. a monomer of formula (III)). Preferred polymers are those obtainable by polymerisation of monomers of formulae (I), (II) and (III) in a molar ratio of 1:1:1 to 20:100:20 more preferably about (1-10):(1-100):(1-5), e.g. about 1:(1-100):1.

Particularly preferred polymers (e.g. terpolymers) for use in the invention comprise repeating units represented by formula (IV) and/or formula (V):

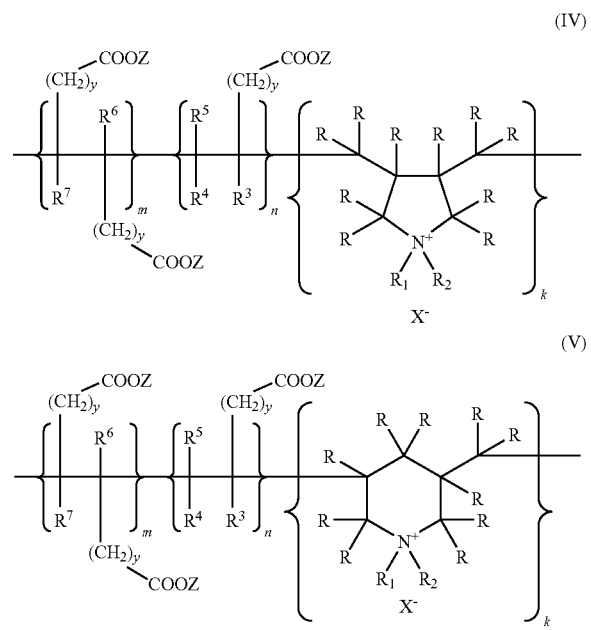

(wherein
R, $R^1$, $R^2$, $R^3$, $R^4$, $R^5$, $R^6$, $R^7$, X, Z and y are as hereinbefore defined;
m is an integer from 1 to 100, preferably 5 to 50, more preferably 20 to 40;
n is an integer from 1 to 500, preferably 50 to 200, more preferably 100 to 150; and
k is an integer from 1 to 100, preferably 5 to 50, more preferably 20 to 40.

In preferred polymers the sum of m, n and k is 100 to 500, preferably 300 to 380, e.g. about 330 to 360.

In the polymers herein described the repeat units deriving from monomers of formulae (I), (II) and (III) may be distributed randomly along the length of the polymer chain (i.e. the polymer may be a random polymer). Alternatively the polymer may be a block or alternating polymer. Preferred polymers for use in the invention are random polymers. Formulae (IV) and (V) are not, however, intended to represent any particular polymer. Rather, in formulae (IV) and (V), "m", "n" and "k" are simply intended to denote the total number of each repeat unit deriving from monomers of formulae (III), (II) and (I) in the polymer chain, respectively (i.e. they do not represent the way in which the monomers are distributed throughout the polymer). Moreover formulae (IV) and (V) are also not intended to represent any particular geometric configuration of the repeat unit deriving from the monomers of formulae (II) and/or (III) (e.g. the —COOZ groups may be present on the same side of the polymer chain or on different sides).

During polymerisation of the monomers described herein various different bonds may form. For example, a bond may be formed between a —$CR^3$COOZ carbon atom of a first monomer of formula (II) and a carbon atom of a monomer of formula (I). Alternatively, a bond may be formed between a —$CR^4R^5$ atom of a monomer of formula (II) and a carbon atom of a monomer of formula (I). Similarly a bond may form between a —$CR^3$COOZ carbon atom of a first monomer of formula (II) and a —$CR^6(CH_2)_y$COOZ carbon atom of a monomer of formula (III). Alternatively, a bond may be formed between a —$CR^3$COOZ carbon atom of a first monomer and a —$CR^7(CH_2)_y$COOZ carbon atom of a monomer of formula (III). Formulae (IV) and (V) are intended to encompass all such resulting polymers (i.e. these structures are merely schematic and are not intended to be limited to the particular linkage which is shown). Polymers (e.g. terpolymers) for use in the present invention may comprise any mixture of such bonds.

The polymerisation reaction may also involve an intramolecular-intermolecular mechanism sometimes called cyclopolymerisation. In this mechanism a 5- or 6-membered ring may be formed from the monomer of formula (I) in the polymerisation reaction (by an intramolecular reaction). The ring then reacts with a further monomer (e.g. a monomer of formula (I), (II) or (III)) in an intermolecular reaction to extend the length of the polymer chain. Further intramolecular and intermolecular reactions may then occur.

During the intramolecular reaction step of the polymerisation, the new bond may be formed between the terminal carbon atom of one allyl group (i.e. at =N—$CR_2$—CR=$CR_2$) and the central carbon atom of the second allyl group (i.e. at =N—$CR_2$—CR=$CR_2$). This reaction yields a 6-membered ring (i.e. forms a repeat unit of formula (V)). Alternatively, the new bond may be formed between the central carbons atom of both allyl groups. This reaction yields a 5-membered ring (i.e. forms a repeat unit of formula (IV)).

The polymers (e.g. terpolymers) for use in the invention may comprise any ratio of repeat units of formulae (IV) and (V). For instance, the ratio of (IV):(V) may be in the range 99:1 to 1:99. More preferably the ratio of (IV):(V) is in the range 98:2 to 50:50, e.g. at least 95:5. Still more preferably the polymer for use in the invention is substantially free from repeat units of formula (V) (e.g. the polymer comprises less than 2% wt repeating units of formula (V)). Polymers which consist essentially of the repeat units shown in formula (IV) are particularly preferred.

Preferably the polymers (e.g. terpolymers) for use in the present invention are substantially linear. For example, it is preferred that less than 10%, more preferably less than 5% cross linking is present. Still more preferably the polymers for use in the present invention are water-soluble.

The weight average molecular weight of the polymer for use in the present invention is preferably in the range 500 to 500,000 more preferably 1,000 to 100,000, still more preferably 1,500 to 50,000, e.g. 2000 to 10000.

Preferred polymers (e.g. terpolymers) for use in the invention are also those with one or more inorganic end groups. By an "end group" is meant a non-monomeric group which is located at an end of the polymer chain and/or on a side group (e.g. —COOH) of the polymer chain and is covalently attached to the monomer adjacent thereto. Representative examples of preferred inorganic end groups include —$SO_4H$, —$SO_3H$, —$H_2PO_3$, —$H_2PO_4$ and salts thereof. Further preferred end groups include anionic derivatives of the aforementioned groups (e.g., —$SO_4^-$, —$SO_3^-$—$HPO_3^-$ and —$HPO_4^-$). These end groups may be incorporated into the polymer during polymerisation from a chain transfer agent and/or initiator. Groups containing phosphorous are particularly preferred (e.g. —$H_2PO_3$, —$H_2PO_4$, —$HPO_3^-$, —$HPO_4^-$). Especially preferred end groups are those which form phosphate esters. Phosphorus containing end groups, that may be introduced by using hypophosphorus acid or salts thereof as a chain transfer agent during polymerisation, facilitate measurement of the concentration of polymer in the production waters (e.g. by ICP).

Polymers (e.g. terpolymers) for use in the invention may have one or more (e.g. 1 or 2) end groups. The end groups may be bound to repeat units deriving from diallyl ammonium salts and/or repeat units deriving from a monomer comprising one carboxylate group (e.g. a monomer of formula (II)) and/or a monomer comprising at least two carboxylate groups or an anhydride group (e.g. a monomer of formula (III)). In preferred polymers for use in the invention at least one end group is covalently bound to a repeat unit deriving from a monomer comprising one carboxylate group (e.g. a monomer of formula (II)).

Whilst not wishing to be bound by theory, it is believed that the multiple positive and negative charges (especially positive charges) of the polymers (e.g. terpolymers) hereinbefore described offer the desirable level of absorptivity to the surface of the formation for use as a scale inhibitor, especially by a "squeeze" treatment. At the same time, the mixture of charges presented by the polymer of the invention may function to bind or trap cations (e.g $Ba^{2+}$, $Sr^{2+}$, $Ca^{2+}$) and anions (e.g. $SO_3^{2-}$, $CO_3^{2-}$) deriving from sea water and the subterranean formation, such that they become polymer bound. More specifically it is thought that by "fixing" the polymers of the present invention to the surface of the formation (e.g. by electrostatic attraction) they serve to physically block scale formation as well as serving as a means to bind or trap scale forming cations and/or anions. The result is that the aforementioned cations and anions cannot undergo reaction with each other therefore the formation of scale is inhibited or prevented, especially on the surface of equipment. This affect is believed to be maximised by use of a polymer (e.g. terpolymer) made from a mixture of ionic-monomers as hereinbefore described.

The polymers (e.g. terpolymers) for use in the invention are preferably applied as a solution or dispersion (e.g. a solution) in a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water).

When the liquid carrier is aqueous, it is preferred that the solution or dispersion of polymer (e.g. terpolymer) in carrier liquid has a pH less than 7. Preferably the pH of polymer solution/dispersion is 1 to 6, more preferably 2 to 5, e.g. about 3 to 4.

The concentration of the polymer (e.g. terpolymer) in the carrier liquid will be an amount effective to inhibit scale formation and will be readily determined by those skilled in the art. Typically, however, the polymer will be present in the liquid carrier at a concentration of 0.05 to 50% wt, preferably 0.1 to 30% wt, more preferably 1 to 20% wt, e.g. about 5 to 10% wt or 6 to 15% wt. Such carrier liquids may provide an inhibitor concentration in the fluids present in a hydrocarbon formation of at least 5 ppm (by volume), preferably 20 ppm (by volume). Representative examples of inhibitor concentrations in the fluids of a formation are 1 to 10,000 ppm (by volume), more preferably 10 to 5000 ppm (by volume), still more preferably 20 to 1000 ppm (by volume, e.g. about 50 ppm (by volume). The liquid carrier may also contain other additives known in the art for use in well treatment. Such additives include surfactants, thickeners, diversion agents, corrosion inhibitors, pH buffers, catalysts and other scale inhibitors. Preferably the liquid carrier further comprises a conventional scale inhibitor. Representative examples of conventional scale inhibitors that may be used in the method of the invention include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate) and 2-acrylamido-2-methyl-1-propanesulphonic acid (AMPS).

Particularly preferably the liquid carrier consists essentially of a polymer (e.g. terpolymer) as hereinbefore defined and optionally a further scale inhibitor. Still more preferably the liquid carrier consists essentially of a polymer (e.g. terpolymer) as hereinbefore defined.

The amount of treatment composition to be used to inhibit scale formation will vary widely depending on factors such as the nature of the polymer used, the nature of the formation (e.g. the levels of Ba, Sr and Ca present) and so on. The appropriate amount of polymer will be readily determined by those skilled in the art. Typically, however, a polymer may be employed with a 10% treatment solution in an amount in the range of from 0.01 to 5 tons per $m^3$ of formation to be treated, more preferably from 0.02 to 0.01 tons per $m^3$ The treatment method of the present invention may be applied to a hydrocarbon producing system at any stage, e.g. before and/or after hydrocarbon production. Treatment according to the invention may also be repeated as many times as necessary.

Treatment according to the method of the present invention may be conducted according to any techniques conventional in the art and any convenient equipment may be used to supply the treatment composition to the hydrocarbon producing system. For instance, bull heading or coil tubing may be used. Thus the treatment composition may be introduced into a well bore by, for example, injection under pressures sufficient to penetrate the formation and the equipment present therein. A preferred method for introducing the polymers (e.g. terpolymers) hereinbefore described into a hydrocarbon producing system is a "squeeze" treatment.

Although the method of the invention may be carried out on a hydrocarbon producing system (e.g. a subterranean formation) without any pre-flush, it is preferred to treat the formation with a pre-flush composition prior to treatment with the polymer described herein. The purpose of the pre-flush may be, for example, to wet the surface of the formation (e.g, if the formation is oil-rich) to aid retention of the polymer described herein. The pre-flush composition may therefore include a surfactant.

An after-flush or over-flush composition may also be optionally used in the method of the invention. An after-flush is typically done following addition of the polymer (e.g. terpolymer) described herein. It serves to displace any polymer which has not absorbed onto the surface of the formation out of the well bore. Any convenient aqueous or non-aqueous, preferably aqueous, liquid may be used.

Treatment times or periods of shut in will depend on a number of factors including the nature of the polymer (e.g. terpolymer) used, the nature of the formation and the level of scaling which would otherwise occur. Typical shut in times may be readily determined by those skilled in the art and will generally be in the range from 0.5 to 24 hours, preferably 1 to 16 hours, e.g. about 8 to 12 hours.

A particularly preferred polymer (e.g. terpolymer) for use in the present invention is prepared by polymerising a monomer of formula (I), a monomer comprising one carboxylate group (e.g. a monomer of formula (II)) and a monomer comprising at least two carboxylate groups or an anhydride group (e.g. a monomer of formula (III)). Thus viewed from a still further aspect the invention provides a method of making a polymer comprising polymerising a monomer of formula (I) with a monomer comprising one carboxylate group (preferably a monomer of formula (II)) and a monomer comprising at least two carboxylate groups or an anhydride group preferably a monomer of formula (III)).

Polymerisation is preferably carried out in solution. Still more preferably the polymerisation is carried out in water. The pH of the polymerisation medium is preferably 4 to 7, still more preferably 5 to 6.5. If necessary the pH of the medium can be adjusted by addition of a neutralising solution (e.g. NaOH (aq.)).

An initiator will typically be used to start polymerisation. Any water soluble initiator can be employed for this purpose, e.g. hydrogen peroxide, dialkyl peroxides, persulfates and azo compounds. Sodium persulfate is a preferred initiator. Initiators are generally used in an amount of 0.1-10% wt of the total weight of monomers, more preferably 0.5-5% wt of the total weight of monomers, e.g. about 1-2% wt of the total weight of monomers.

In a preferred polymerisation method, a chain transfer agent is also used. Any conventional chain transfer agent may be utilised although hypophosphorus acid and salts thereof are preferred. Hypophosphorus acid and salts thereof may advantageously provide polymers having end groups as hereinbefore defined. Chain transfer agents are typically used in an amount of 1-20% wt of the total weight of monomers, more preferably 2-10% wt of the total weight of monomers.

The polymerisation reaction will typically be carried out at a temperature of 60 to 120° C., preferably 80 to 110° C., e.g. about 100° C. Generally polymerisation occurs for 1 to 4 hours, e.g. about 2 to 3 hours.

Thus, in a typical polymerisation method, monomers (e.g. DADMAC, acrylic acid and fumaric acid or maleic acid) are dissolved in water and heated to 60-100° C. A neutralising solution (e.g. NaOH solution) is then optionally added (e.g. if acrylic acid monomers are employed). Initiator and chain transfer agent, both dissolved in water, are added and the temperature is increased until reflux occurs. Generally polymerisation will occur for about 2 hours. The polymer may then be isolated by conventional techniques.

A polymer obtainable by a method as hereinbefore described forms a further aspect of the invention.

Viewed from yet another aspect the invention provides a polymer formed from a diallyl ammonium salt, a monomer comprising one carboxylate group and a monomer comprising at least two carboxylate groups or an anhydride group as hereinbefore defined.

Viewed from a still further aspect the invention provides a polymer formed from a diallyl ammonium salt, a monomer comprising one carboxylate group and a monomer comprising at least two carboxylate groups or an anhydride group as hereinbefore defined for use as a scale inhibitor. Such inhibitors may be used in the treatment of a hydrocarbon producing system as hereinbefore described or in the treatment of aqueous systems. Examples of aqueous systems include heat-exchanger systems (e.g. boiler systems, water cooling systems), desalination systems and gas scrubbers.

The invention will now be further described by way of the following non-limiting Examples and Figures wherein.

EXAMPLE 1

A terpolymer of acrylic acid, DADMAC and fumaric acid or maleic acid was prepared in a 1 $m^3$ reactor equipped with a mechanical stirrer, a condenser, a thermometer and inlets. The following materials were used:

| | |
|---|---|
| Acrylic acid | 220 kg |
| Fumaric acid or maleic acid | 20 kg |
| DADMAC (60% in water) | 20 kg |
| Sodium hypophosphite | 20 kg (in 40 kg deionised water) |
| Sodium persulfate | 1.8 kg (in 6 kg deionised water) |
| NaOH | 70 kg (in 114 kg deionised water) |

200 kg deionised water was added to the reactor and heated to 60° C. The monomers (i.e. acrylic acid, DADMAC and fumaric acid or maleic acid) were then added and the solution stirred. NaOH was added to neutralise the reaction mixture and the initiator (sodium persulfate) and chain transfer agent (sodium hypophosphite) were added to induce polymerisation. The reaction mixture was then heated to reflux and stirred for 2 hours. The resulting terpolymer was then isolated.

EXAMPLE 2

Dynamic loop tests were conducted in order to evaluate the performance of the terpolymers produced in example 1 in scale control.

The brines used in the studies were synthetic Heidrun formation water, seawater and a 6% NaCl brine made from dissolved salts. The compositions of these brines are given in Table 1:

TABLE 1

Composition of Brines

| Composition (mg/l) | Heidrun Formation Water | Sea water |
|---|---|---|
| $Na^+$ | 19510 | 11150 |
| $K^+$ | 545 | 420 |
| $Ca^{2+}$ | 1020 | 428 |
| $Mg^{2+}$ | 265 | 1410 |
| $Ba^{2+}$ | 255 | 0 |
| $Sr^{2+}$ | 145 | 0 |
| $SO_4^{2-}$ | 0 | 2800 |
| $Cl^-$ | 33190 | 20310 |

The dynamic scale inhibitor performance test is designed to evaluate the ability of the test inhibitor to delay the nucleation and growth of scale on a metal surface. All tests were performed with mixed brines, i.e. 50:50 Heidrun formation water:seawater (see Table 1). The test conditions were designed to represent an extreme case of barium sulphate scaling.

Figure 1:
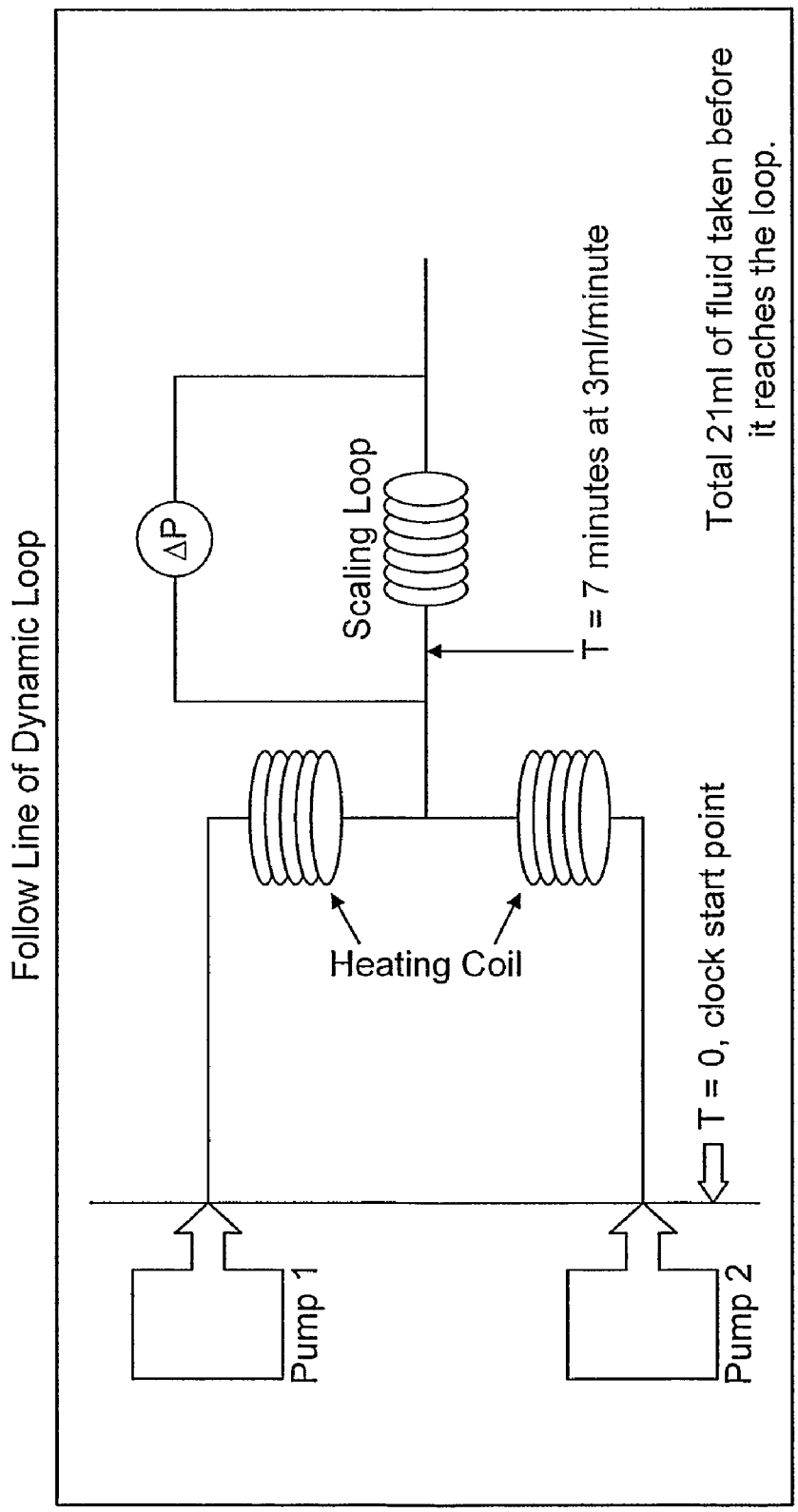
FIG. 1 is a schematic of the equipment used to carry out dynamic loop tests

A schematic of the equipment used is presented in FIG. 1. In the tests, the formation water and seawater were separated into non-scaling cation and anion brine fractions such that on mixing the anion and cation brine fractions the mixed brine would be representative of 50:50 mixed formation water and sea water. The barium is present in the cation brine and sulphate is present in the anion brine. The two brines were pumped separately into the heating coil using two pumps (this ensures the fluids reach the test temperature before they mix in the loop). After passing the heating coil, the cation and anion brines were then mixed at the T-junction of the inlet of the scale loop. The formation of scale within the scale loop was tracked by measuring the differential pressure changes across the loop as a function of time. Scale inhibitors are designed to prevent the adhesion and growth of scale within the scale loop and thus prevent an increase in differential pressure at a particular concentration. This is termed the minimum inhibitor concentration (MIC).

The transport time for the anion and cation brines prior to mixing was 7 minutes at a pump rate of 3 ml/minute. This represents a dead volume of 21 ml of total fluid, pumped by each pump.

The test conditions were set as below:

| | |
|---|---|
| Temperature: | 85° C. |
| Ambient pH of mixed brine: | 6.5 ± 0.3 (adjusted with 0.1M NaOH) |
| Coil length: | 1 m |
| Coil internal diameter: | ~0.9 mm |
| Flow rate: | 10 ml/min |
| Pre-scale: | no |

Following each test, the loop was cleaned with 50 ml scale dissolver, 50 ml de-ionised (DI) water, 50 ml 1% acetic acid solution then DI water until pH=7±1. The effectiveness of each of the terpolymers in inhibiting scale formation for 3 hours is shown in FIGS. 2 and 3.

Figure 2:
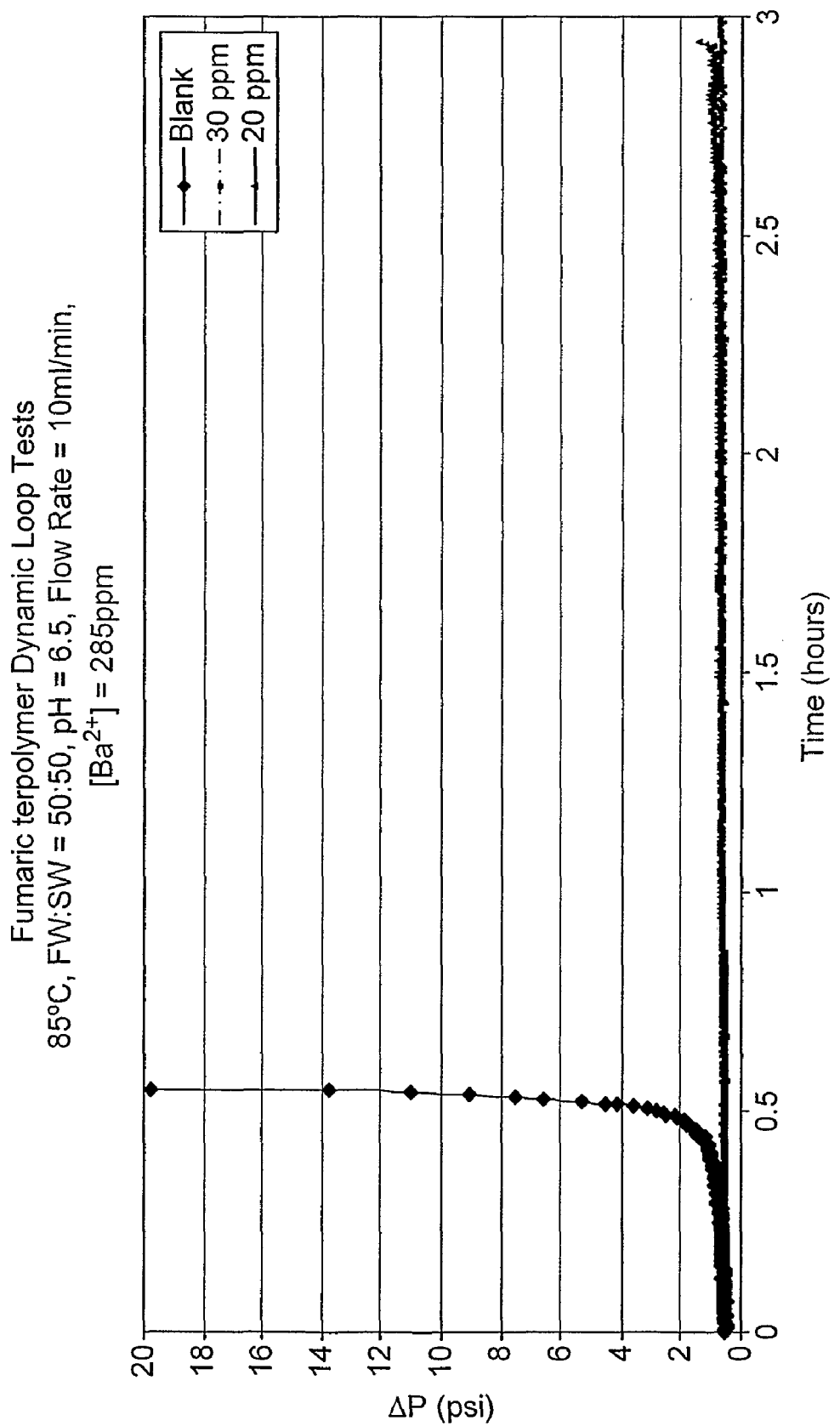
FIG. 2 shows the results of a dynamic loop test carried out with a fumaric acid containing terpolymer
Figure 3:
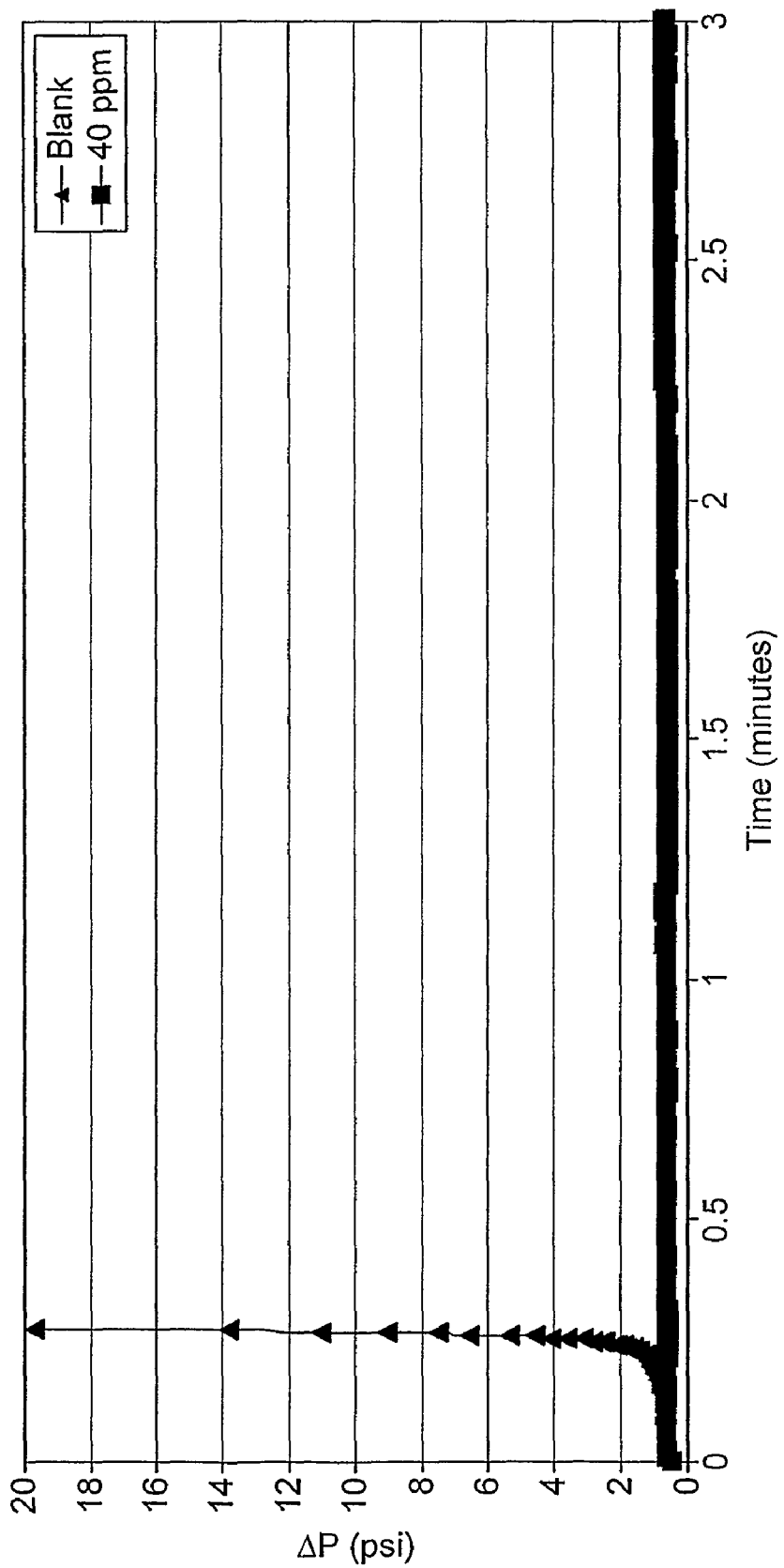
FIG. 3 shows the results of a dynamic loop test carried out with a maleic acid containing terpolymer

The plots in FIGS. 2 and 3 show the differential pressure measured vs. time. In FIGS. 2 and 3 the line marked "Blank" represents the test without scale inhibitor where scale quickly built up inside the coil resulting in a steep increase in the differential pressures.

In FIG. 2 the grey lines represent the tests where 30 and 20 ppm of fumaric acid-containing terpolymer scale inhibitor were present in the mixed brine respectively. Both grey lines clearly show that when the inhibitor concentration was 20 to 30 ppm, the barium sulphate scale precipitation was well controlled, resulting in stable differential pressure readings.

Similarly in FIG. 3 the grey line represents the test where 40 ppm maleic acid-containing terpolymer scale inhibitor was present in the mixed brine. It shows that when the inhibitor concentration is 40 ppm, the barium sulphate scale precipitation was well controlled, resulting in stable differential pressure readings.

The dynamic loop tests demonstrate that the terpolymer material of the present invention is an effective scale inhibitor under North Sea reservoir conditions. Under the given conditions where the barium concentration is as high as 285 ppm, the scale inhibitor can control the barium sulphate precipitation in the dynamic loop at 20 to 40 ppm at 3 hours test interval.

The invention claimed is:

1. A hydrocarbon well treatment composition comprising a carrier liquid and a polymer formed from a diallyl ammonium salt of formula (I):

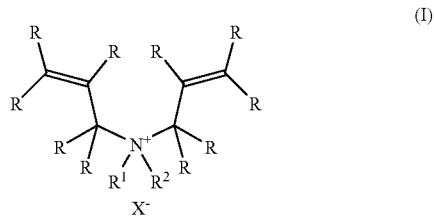

(I)

wherein $R^1$ and $R^2$ are each independently hydrogen or unsubstituted organic radicals having from 1 to 20 carbon atoms;

wherein each R is independently selected from hydrogen or organic radicals having from 1 to 20 carbon atoms; and wherein X is a counterion, and a monomer comprising one carboxylate group and a monomer comprising at least two carboxylate groups or an anhydride group, wherein said polymer comprises an end group selected from $-SO_4H$, $-SO_3H$, $-H_2PO_3$, $-H_2PO_4$ or anionic derivatives thereof, and wherein the concentration of said polymer in said carrier is 6 to 50% wt.

2. The composition as claimed in claim 1, wherein said polymer is formed from diallyl dimethyl ammonium chloride.

3. The composition as claimed in claim 1, wherein said monomer comprising at least two carboxylate groups is selected from maleic acid or fumaric acid.

4. A method for inhibiting scale formation within a hydrocarbon producing system, said method comprising contacting said system with a polymer formed from a diallyl ammonium salt of formula (I):

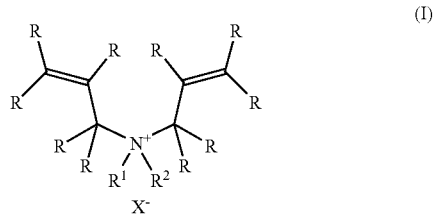

(I)

wherein $R^1$ and $R^2$ are each independently hydrogen or unsubstituted organic radicals having from 1 to 20 carbon atoms;

wherein each R is independently selected from hydrogen or organic radicals having from 1 to 20 carbon atoms; and wherein X is a counterion, a monomer comprising one carboxylate group and a monomer comprising at least two carboxylate groups or an anhydride group, and wherein said polymer comprises an end group selected from —$SO_4H$, —$SO_3H$, —$H_2PO_3$, —$H_2PO_4$ or anionic derivatives thereof, and said polymer is applied as a solution or dispersion in a liquid carrier, the concentration of said polymer in said carrier is 6 to 50 wt. %.

5. A method as claimed in claim 4, wherein said monomer comprising one carboxylate group is selected from acrylic acid or methacrylic acid.

6. A method as claimed in claim 4, wherein said monomer comprising at least two carboxylate groups or an anhydride group is a monomer of formula (III):

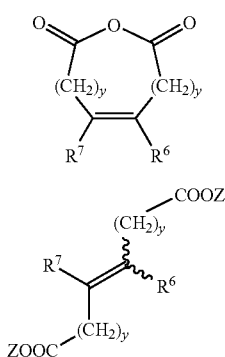

(IIIa)

(IIIb)

wherein Z is a counterion;
wherein each y is independently an integer from 0 to 3; and
wherein $R^6$ and $R^7$ are each independently hydrogen, an optionally substituted alkyl or aryl group having from 1 to 6 carbon atoms, —$CO_2Z$, —$SO_3Z$ or —$PO_3Z_2$.

7. A method as claimed in claim 4, wherein said polymer is applied as a squeeze treatment.

8. A method as claimed in claim 4, wherein said polymer is formed from diallyl dimethyl ammonium chloride.

9. A method as claimed in claim 4, wherein said monomer comprising one carboxylate group is a monomer of formula (II):

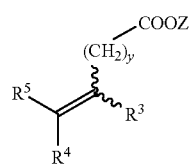

(II)

wherein Z is a counterion;
wherein y is an integer from 0 to 3; and wherein $R^3$, $R^4$ and $R^5$ are each independently hydrogen, an optionally substituted alkyl or aryl group having from 1 to 6 carbon atoms, —$SO_3Z$ or —$PO_3Z_2$.

10. A method as claimed in claim 6, wherein said monomer of formula (III) is selected from maleic acid or fumaric acid.

11. A method as claimed in claim 4, wherein said polymer comprises repeating units represented by formula (IV) and/or formula (V)

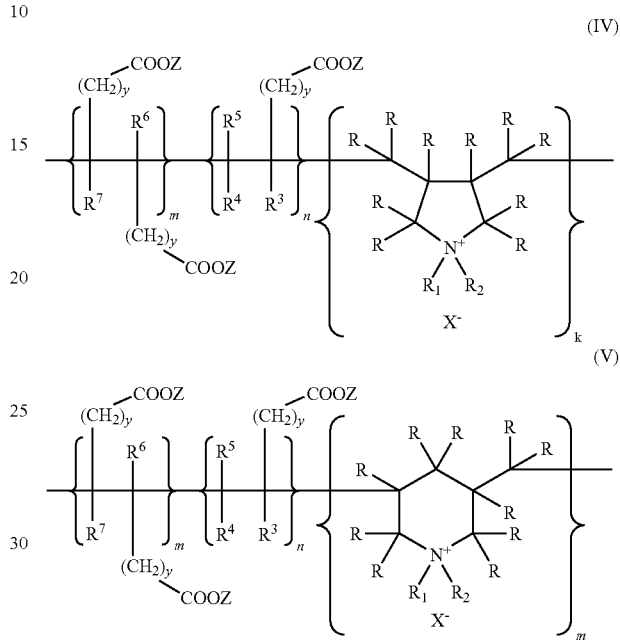

wherein R is independently selected from hydrogen or organic radicals having from 1 to 20 carbon atoms;
wherein $R^1$ and $R^2$ are each independently hydrogen or unsubstituted organic radicals having from 1 to 20 carbon atoms;
wherein $R^3$, $R^4$ and $R^5$ are each independently hydrogen, an optionally substituted alkyl or aryl group having from 1 to 6 carbon atoms, —$SO_3Z$ or —$PO_3Z_2$;
wherein $R^6$ and $R^7$ are each independently hydrogen, an optionally substituted alkyl or aryl group having from 1 to 6 carbon atoms, —$CO_2Z$, —$SO_3Z$ or —$PO_3Z_2$;
wherein X is a counterion;
wherein Z is a counterion;
wherein each y is independently an integer from 0 to 3;
wherein m is an integer from 1 to 100;
wherein n is an integer from 1 to 500; and
wherein k is an integer from 1 to 100.

12. A method as claimed in claim 4, wherein said polymer has a molecular weight of 500 to 10,000.

* * * * *